United States Patent [19]

Murtaugh

[11] Patent Number: 4,624,374
[45] Date of Patent: Nov. 25, 1986

[54] UNIVERSAL CONNECTOR
[75] Inventor: John J. Murtaugh, Streator, Ill.
[73] Assignee: Med Marine International Inc., Peru, Ill.
[21] Appl. No.: 652,866
[22] Filed: Sep. 20, 1984
[51] Int. Cl.[4] .............................................. A47F 7/00
[52] U.S. Cl. ................................... 211/60.1; 248/230; 211/182
[58] Field of Search ............... 211/60.1, 182, 13, 70.4, 211/70.2; 248/229, 230, 314, 311.2, 231.6, 316.5, 316.6; 403/234, 235, 236, 237, 65, 79

[56] References Cited

U.S. PATENT DOCUMENTS

| | | | |
|---|---|---|---|
| 597,947 | 1/1898 | Bragger | 248/230 |
| 1,056,574 | 3/1913 | Newton | 248/230 |
| 1,765,651 | 6/1930 | Bryant | 211/182 X |
| 4,526,124 | 7/1985 | Hartwall | 248/311.2 X |
| 4,529,331 | 7/1985 | Schwartz | 403/73 |

Primary Examiner—Ramon S. Britts
Assistant Examiner—Sarah A. Lechok Eley
Attorney, Agent, or Firm—Mason, Kolehmainen, Rathburn & Wyss

[57] ABSTRACT

A universal connector for interconnecting a pair of elongated elements in adjustable angular relation includes a pair of cooperative clamping members adapted to be clamped in place on one of said elongated elements and a third member adapted to be secured to the other of said pair of elongated elements. Each of said clamping members includes a clamping portion intermediate the ends adapted to clampingly engage a surface on one side of one elongated element and has first and second opposite end portions extending outwardly thereof. The first end portions of the clamping members are pivotally and releasably interconnected for permitting opposed intermediate clamping portions to move toward and away from each other between a clamping position and an open position. The clamping members also include a pivot for supporting the third member of connector to permit angular adjustment between the pair of elongated elements when the connector members are clamped and secured in place. A threaded fastener is provided for interconnecting the second end portions of the opposing clamping members to move the clamping portions thereof into clamping engagement against the elongated element to secure the universal connector in place for angularly interconnecting the pair of elongated elements.

16 Claims, 4 Drawing Figures

U.S. Patent    Nov. 25, 1986    4,624,374
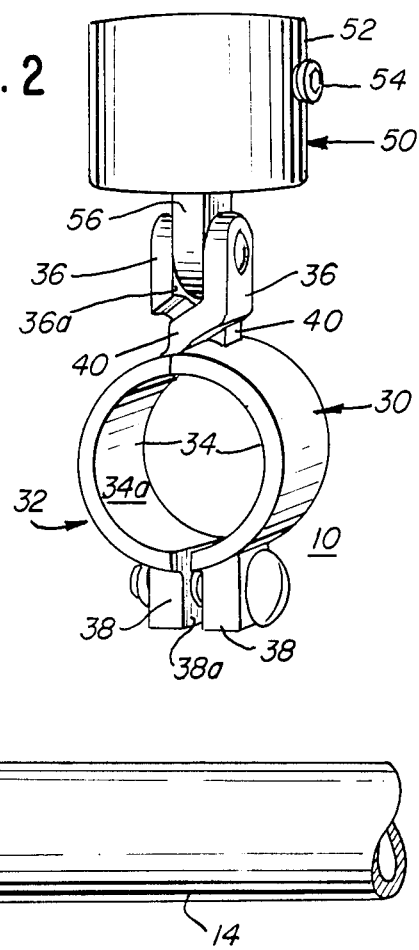
FIG. 1
FIG. 2
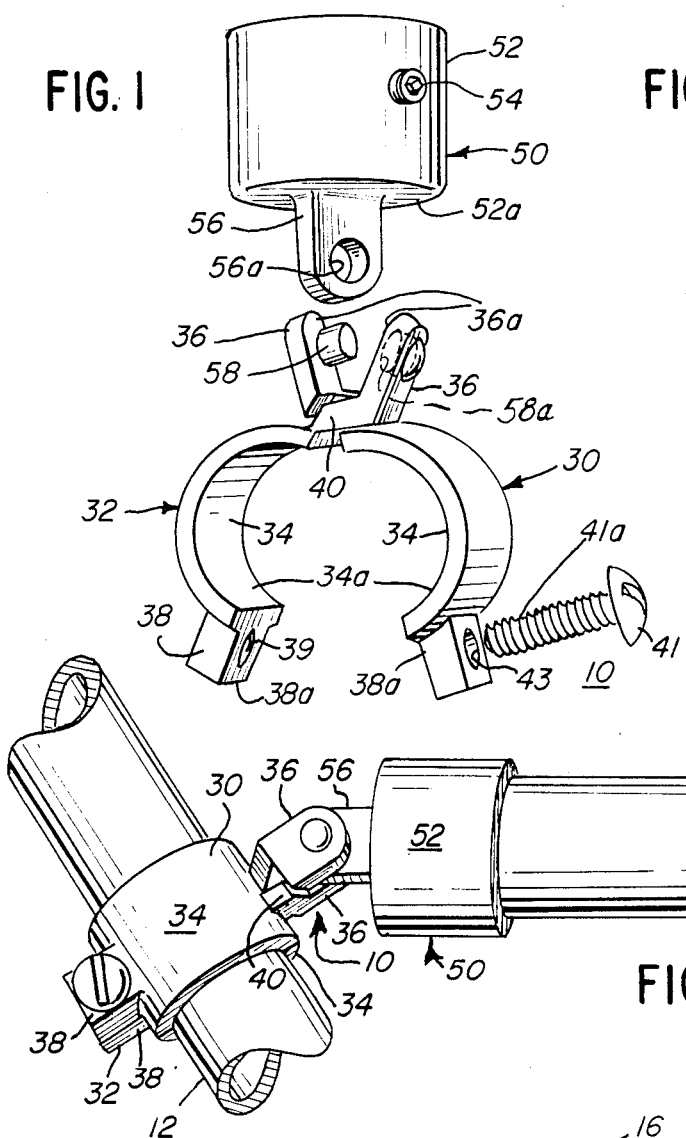
FIG. 3
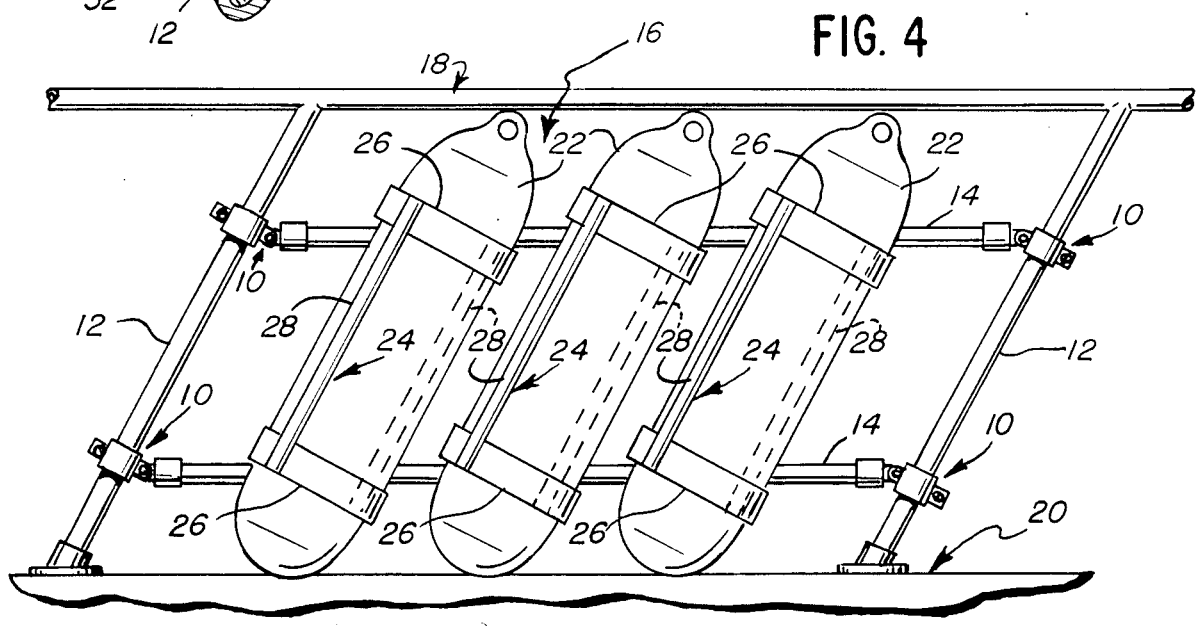
FIG. 4

UNIVERSAL CONNECTOR

BACKGROUND OF THE INVENTION

1. Field of the Invention

The present invention relates to a new and improved universal connector for interconnecting a pair of elongated elements and more particularly relates to a universal connector especially well suited for use in railings, guard rails and the like, particularly of the type used on stairways, boats, machinery platforms and other places where the security of a railing structure is desired.

More particularly the universal connector of the present invention is especially adapted for use with elongated members which are arranged in adjustable angular relation and secured together with the connector. The connector is especially desirable because drilling, welding or cutting of the elongated members is not required as in many connectors of the prior art.

2. Description of the Prior Art

The following U.S. patents pertain to clamps, brackets, fittings and connectors used for interconnecting elongated elements in adjustable angular relation:

Manton's No. 116848,
Newton No. 1,056,574,
Falk No. 1,423,927,
MacBeth No. 2,392,932,
Thurnauer No. 4,150,907

OBJECTS OF THE INVENTION

It is an object of the present invention to provide a new and improved universal connector for interconnecting a pair of elongated elements in adjustable angular relation.

More particularly, it is an object of the present invention to provide a new and improved universal connector of the character described which does not require cutting, drilling or welding of the elongated elements themselves which are to be interconnected.

Another object of the present invention is to provide a new and improved universal connector of the character described which is neat in appearance, easy to install and which includes only a single fastening element for securing the connector in place.

Still another object of the present invention is to provide a new and improved universal connector of the character described especially designed and adapted for use on marine boat railing structures, and more particularly, to provide a new and improved fender support rack for marine use.

Still another object of the present invention is to provide a new and improved universal connector of the character described which can be formed of material such as stainless steel for resisting corrosion and oxidation after prolonged exposure to the weather.

BRIEF SUMMARY OF THE INVENTION

The foregoing and other objects and advantages of the present invention are accomplished in a new and improved, universal connector for interconnecting a pair of elongated elements in adjustable angular relation. The connector includes a pair of cooperative clamping members adapted to be clamped in place on one of the elongated elements and a third member adapted to be secured to the other of the elongated elements and pivotably interconnected to the first pair of clamping members. Each of the clamping members has a clamping portion intermediate the ends adapted to clampingly engage a surface on one side of one elongated element and has first and second opposite end portions projecting outwardly from the intermediate section thereof. The first end portions of the opposed clamping members are pivotally and releasably interconnected for permitting the intermediate portions to move toward and away from each other between a closed or clamping position and an unclamping or open position. A pivotal connection is provided between the first end portions of the opposed clamping members for pivotally supporting the third member of the connector to permit angular adjustment between the elongated elements when the members of the connector are clamped and secured in place. A single fastener in the form of a threaded screw is used for interconnecting the second end portion of the opposing clamping members to draw the clamping portions into clamped engagement at any desired location along one of the elongated elements which is to be angularly interconnected to the other elongated element with the universal connector of the present invention.

BRIEF DESCRIPTION OF THE DRAWING

For a better understanding of the invention, reference should be had to the following detailed description when taken in conjunction with the drawing, in which:

FIG. 1 is a perspective view of a universal connector in accordance with the present invention shown in an open position ready for installation;

FIG. 2 is a perspective view of the connector shown in a closed position;

FIG. 3 is a fragmentary, perspective view of the universal connector of the present invention shown in position after being installed to interconnect a pair of elongated post and rail members of a railing structure on a boat; and FIG. 4 is an elevational view of a railing and fender rack structure for a boat employing a plurality of universal connectors of the present invention.

DESCRIPTION OF THE PREFERRED EMBODIMENT

Referring more particularly to the drawing, therein is illustrated a new and improved universal connector constructed in accordance with the features of the present invention and referred to generally by the reference numeral 10. The connector 10 is adapted to angularly interconnect a pair of elongated elements such as elongated posts 12 and rails 14 for a fender support rack 16 on a railing structure 18 of a boat or vessel 20. In particular, the fender support rack 16 is adapted to hold a plurality of boat fenders 22, each fender being supported in an individual holder 24 comprising a pair of upper and lower circular rings 26 secured to the rails 14 and joined by a pair of longitudinally extending rods 28 on diametrically opposite sides of the rings. The resultant support rack structure with fenders in place provides a neat and handy storage capability for boat fenders, making them readily available for use when needed.

In accordance with the present invention the universal connector 10 includes a pair of opposed clamping members 30 and 32 which are pivotally and releasably or separably interconnected with one another to move between an open position as shown in FIG. 1 ready for installation and a closed or clamping position as shown in FIGS. 2 and 3 wherein the clamping members are secured in place at any desired position on a post 12 or rail 14 without requiring the cutting, drilling or welding of the post or rail itself in order to provide the means for secure attachment.

Each of the clamping members 30 and 32 includes an intermediate clamping segment 34 having a concave clamping surface 34a shaped generally to conform to the cross-section of the rail, post or rod on which the universal connector is to be mounted. When used with elongated elements of circular cross section, the intermediate clamping segments of the clamping members 30 and 32 are semi-cylindrical in shape as shown, in order to provide a relatively large, frictional surface area of clamping contact between the clamping members and the rod, post or rail on which the connector is to be mounted.

Outwardly of the intermediate, semi-cylindrical clamping portion 34, each clamping element 30 and 32 is provided with an integrally formed, first end portion or lug 36 having an inside face 36a on a generally radial or diametrical plane and adapted to lie in parallel, spaced apart relation with the inside face 36a of the opposite clamping member when the members are in a closed or clamping position as shown in FIG. 2. At the opposite end, each of the clamping members 30 and 32 includes a second end portion or lug 38 having an inner face 38a lying on a generally radial or diametrical plane with respect to a concave semi-cylindrical clamping surface 34a of the intermediate portion of the clamping member. When the clamping members 30 and 32 are positioned in a closed or clamping position as shown in FIG. 2 the respective pairs of lug faces 36a and 38a lie in opposed, facing, parallel relationship as shown.

A first end lug 36 of the clamping member 30 is disposed in line with a second end lug 38 of the clamping member 32 and the first end lug 36 of the clamping member 32 is in line with the second end lug 38 of the clamping member 30. The first end lugs 36 are offset from their respective intermediate clamping portions 34 by scissors-like leg portions 40 integrally joining the lugs to the respective intermediate clamping portions 34. These scissors-like leg portions 40 as best shown in FIGS. 2 and 3 provide a detachable, interlocking scissors-like pivotal interconnection between the respective opposed clamping members 30 and 32 so that the clamping members may be easily pivoted relative to one another between the open position of FIG. 1 and the closed position of FIG. 2. As illustrated best in FIG. 3, the offset legs 40 have a width substantially one half that of the total width of the radial end lugs 36.

When the clamping elements 30 and 32 are in the open position of FIG. 1, the elements can be separated or detached from one another by moving them apart in the direction of the pivot axis. Thus it is not necessary that the elements pivot apart to the width of the post 12 or other member on which the connector 10 is to be mounted. Instead, the elements 30 and 32 can be detached from one another and reassembled upon the post 12 or other member. In the closed position with the elements 30 and 32 clamped in place, the elements cannot be separated or detached and a firm mounting is achieved.

In accordance with a feature of the present invention, the first end lugs 36 are adapted to provide a support pivot or axle for pivotally supporting a third element 50 of the universal connector 10. The third element 50 of the connector assembly includes a generally cylindrical socket portion 52 open on the outer end in order to receive and support the end portion of a rail 12 or post 14 inserted therein as shown in FIGS. 3 and 4. A socket type set screw 54 is provided to tightly secure the end portion of a post or rail in place in the open ended socket portion 52 of the third connector member 50. The socket portion includes a radial end wall 52a and a lug 56 is integrally formed on the end wall to project outwardly thereof on a diametrical center plane and adapted for pivotal interconnection with the first end lug 36 of the clamping members 30 and 32. The socket member end lug 56 is provided with a circular bore 56a adjacent a rounded outer end portion and the circular bore is adapted to accommodate a pivot element or axle 58 formed on the inside face 36a of the end lug 36 on the clamping member 30 as best shown in FIG. 1. The inside face 36a of the lug 36 on the opposite clamping member 32 is provided with a shallow recess 58a for receiving the outer end portion of the pivot axle 58 on the opposite lug when the clamping members 30 and 32 are closed together with the end lug 56 sandwiched between the faces 36a of the respective end lugs 36 as shown in FIG. 2. Engagement of axle 58 in recess 58a prevents disassembly or detachment of the elements 30 and 32. In the clamping position as shown in FIG. 2, the third member 50 of the connector assembly 10 is pivotally supported to rotate about an axis extending longitudinally of the pivot axle 58 and thus accommodates a wide range of angular relationships between the elongated elements 12 and 14 which are interconnected by the universal connector 10.

In order to tightly secure the fricitonal clamping surfaces 34a which are semi-cylindrical in shape, against the outer surface of a post, rod or rail, the second end lug 38 on the clamping member 32 is provided with a threaded bore 39 for receiving the threaded shank 41a of a screw fastener 41 used for drawing the opposed clamping members 30 and 32 toward one another into the closed position of FIG. 2. The second end lug 38 on the clamping member 30 is provided with an enlarged cylindrical bore 43 which is dimensioned large enough so that the threaded shank 41a of the fastener 41 can slide easily through when threaded into the bore 39 of the lug 38 on the opposite clamping member 32.

From the foregoing it will be seen that the connector assembly 10 of the present invention employs a pair of opposed clamping members 30 and 32 which pivotally support a third socket-like connector member 50. The connector can be secured in place to positively and firmly mechanically interconnect elongated elements such as posts 12 and rails 14 of a fender rack structure 16. Installation of the connector 10 can be completed easily and rapidly by inserting and tightening only a single fastener 41, and no cutting, drilling or welding of the elongated members sought to be interconnected is required. Thus, installation of the connector 10 is quick and easy and is especially aided by the detachable pivotal interconnection between the clamping members 30 and 32 that is afforded by the offset legs 40 of the first end lugs 36. The pivotal interconnection between the pivot axle 58 and the end lug 56 of the third clamping member 50 permits a wide range of angular adjustment between the assembled connector members of the universal connector 10.

The universal connector of the present invention can be formed of high strength plastic, stainless steel, brass, bronze or other metals as may be required for resisting atmospheric corrosion and weathering during prolonged periods of exposure to the weather as is often encountered in marine applications.

The fender rack 16 illustrated in FIG. 4 provides a neat and pleasant appearance and includes four universal connectors 10 in accordance with the present invention, two each being mounted at appropriate levels on parallel posts 12 of the boat rail structure 18 for interconnecting a pair of parallel, rail elements 14 used to support the fender support racks 24. The existing posts 12 of the boat rail structure do not require cutting, welding, drilling or other provisions for installation of the fender support rack, and the whole support rack can be rapidly installed by a relatively unskilled workman because only four screw-type fasteners 41 need to be tightened after proper positioning of the connectors on the posts 12 is achieved. Moreover, the fender support rack 16 in accordance with the present invention can be installed on a wide range of railing structures even though they have a great variation in angular displacement between the posts and rails, a condition which is commonly encountered on different marine applications.

Although the present invention has been described with reference to several illustrated embodiments thereof, it should be understood that numerous other modifications and embodiments can be made by those skilled in the art that will fall within the spirit and scope of the principles of this invention.

What is claimed as new and is desired to be secured by Letters Patent is:

1. A connector for securing a pair of elongated elements in adjustable angular reglation comprising:
   a pair of cooperative clamping members adapted to be clamped in place on one of said elongated elements, each of said clamping members having a clamping portion intermediate its ends adapted to clampingly engage a surface on one side of said one elongated element and having first and second opposite end portions extending outwardly of said intermediate portion;
   a third member adapted to be secured to the other of said pair of elongated elements;
   said first end portions including hinge means for pivotally and releasably interconnecting said clamping members for permitting said intermediate clamping portions to move toward and away from each other while pivoting about an axis generally parallel of said one elongated elements between a clamping position engaged against said one elongated element and an open position wherein said one elongated element is positioned directly between said second end portions of said clamping member as said connector is moved into a ready position with said one elongaged element directly between said intermediate clamping portions in preparation for clamping engagement thereby, said hinge means of each clamping member including a hinge element and an adjacent open recess adapted to receive the hinge element of the other clamping member seated therein for pivotal movement between said hinge elements while seated in said recesses as said intermediate clamping portions are moved toward and away from each other, at least one of said first end portions including pivot means for pivotally supporting said third member to permit angular adjustment between said pair of elongated elements when said members are clamped and secured thereto; and
   means for interconnecting said second end portions of said clamping members to move said clamping portions thereof into said clamping position on said one elongated element.

2. The connector of claim 1 wherein said intermediate clamping portions include a concave frictional clamping surface shaped to fit against said side of said elongated element.

3. The connector of claim 1 wherein said first end portions include facing surfaces disposed in spaced apart generally parallel relation when said clamping members are in said clamping position.

4. The connector of claim 3 wherein said third member includes a lug sandwiched between said facing surfaces of said first end portions for pivotal movement around said pivot means.

5. The connector of claim 4 wherein said pivot means comprises an integral pivot axle projecting outwardly from one said facing surfaces having an outer end seated in a recess in an opposite facing surface when said clamping members are in said clamping position.

6. The connector of claim 3 wherein said means for pivotally interconnecting said clamping members includes a pair of scissors-like, criss-crossing, offset legs, each leg integrally interconnecting a first end portion and an intermediate clamping portion of a clamping member.

7. The connector of claim 6 wherein said offset legs have a width approximately one half the width of said facing surfaces of said first end portions.

8. The connector of claim 1 wherein said means for interconnecting said second end portions comprises an elongated threaded fastener extending between said second end portions.

9. The connector of claim 8 wherein said threaded fastener includes a head bearing against an outside face of one of said second end portions and a threaded shank in threaded engagement with the other of said second end portions.

10. The connector of claim 9 wherein said other of said second end portions includes a bore extending between inside and outside faces and said shank s of said threaded fastener extends through said bore.

11. The connector of claim 10 wherein said bore has a diameter greater than said shank of said threaded fastener precluding threaded engagement therewith.

12. A rack for boat fenders adapted to be secured to a pair of first elongated elements of a boat railing, comprising:
   a plurality of second elongated elements;
   a plurality of connectors mounted at spaced apart locations on each of said first elongated elements;
   at least one of said connectors including a pair of cooperative clamping members adapted to be clamped in place of one of said first elongated elements, each of said clamping members having a clamping portion intermediate its ends adapted to clampingly engage a surface on a side of a first elongated element and having first and second opposite end portions extending outwardly of said intermediate portion;
   a third member adapted to be secured to one of said second elongated elements;
   said first end portions including hinge means for pivotally interconnecting said clamping members for permitting said intermediate clamping portions to move toward and away from each other while pivoting about an axis extending along said one of said first elongated elements between a clamping position engaged against said one of said first elongated elements and an open position wherein said one of said first elongated elements is positioned directly between said second end portions of said clamping members as said connector is moved onto said one of said first elongated elements toward a ready position wherein said one of said first elongated elements is directly between said intermediate clamping portions ready for clamped engagement therewith, said hinge means of each clamping member including a hinge element and an adjacent open recess adapted to recieve the hinge element of the other clamping member seated therein for pivotal movement between said hinge elements while seated in said recesses as said intermediate clamping portions are moved toward and away from each other, one of said first and portions including pivot means for pivotally supporting said third member to permit angular adjustment between said first and second elongated elements when said members are clamped and secured thereto; and means for interconnecting said second end portions of said clamping members to move said clamping portions thereof into said clamping position on said one elongated element; and said rack including at least one fender support secured to said second elongated elements.

13. The fender support rack of claim 12 wherein said fender support includes a plurality of upper and lower circular rings and a plurality of elongated connector secured to said rings on diametrically opposite sides thereof.

14. The fender support rack of claim 13 wherein said circular rings are attached to said second elongated elements.

15. The fender support rack of claim 13 including a plurality of said fender supports secured to said second elongaged elements between said first elongated elements of said railing.

16. A connector for securing a supported object to an elongated element comprising:

first and second clamping members each including an intermediate clamping portion and a pivot structure adjacent the clamping portion;

each of said pivot structures including a hinge element and an adjacent open recess adapted to recieve the hinge element of the other clamping member seated therein for pivotal movement between said hinge elements while seated in said recesses as said intermediate portions are moved toward and away from one another to permit said clamping members to pivot about an axis extending along said elongated element during installation of said connector thereon between closed and open positions;

said hinge elements of said pivot structures being disengageable from said open recesses to permit said clamping members to be detached from each other and to be assembled with said clamping surfaces engaging the elongated element;

said pivot structures permitting said first and second clamping to open wide enough to accommodate said elongated element directly therebetween as said connector is moved toward a clamping position with said pivot axis moving in a direction generally transversely of said elongated element while said hinge elements are seated in said recesses;

first end portions of said clamping members adjacent said clamping portions opposite said pivot structures adapted to receive fastening means for holding said clamping portions against the elongated element; and second end portions of said clamping members adjacent said pivot structures including means for supporting the supported object.

* * * * *